2,979,813
JOINING OF GRAPHITE MEMBERS

Morris A. Steinberg, University Heights, Ohio, assignor to Horizons Incorporated, Princeton, N.J., a corporation of New Jersey No Drawing. Filed Sept. 28, 1956, Ser. No. 612,599

5 Claims. (Cl. 29—470)

This invention relates to an improvement in the joining of graphite products to one another to provide a joint which retains its strength at temperatures up to as high as 3000° C.

Many methods have been proposed in the past for joining carbon to other materials, including metals, ceramics, and other carbon members. Such proposals have, generally, envisioned the use of tar, pitch, resins, and other adhesives as illustrated in United States Patents 473,841; 974,008; 1,158,171; 2,412,081; 2,670,311; and 2,512,230. Such adhesives function satisfactorily at relatively low temperatures, e.g. up to about 400° F., but lose their strength at higher temperatures and hence have only a limited applicability. Others have suggested the use of inorganic bonding materials such as sodium silicate, as in United States Patent 1,709,892, or elemental bonding agents such as selenium or tellurium, as in British Patent 604,293. A more recent proposal involves the use of a solder based on a metal such as copper and a refractory bonding material such as titanium hydride or zirconium hydride, as described in United States Patent 2,570,248. One common difficulty with each of the foregoing has been the inability of the joint to perform at elevated temperatures.

I have now discovered a process in which graphite members may be bonded to other graphite members or to other materials by materials which function in an entirely different manner from the simpler adhesives of the prior art and which produce structures which remain bonded at elevated temperatures.

Briefly, instead of an adhesive type bonding material, I have found that a material which is capable of entering into chemical combination with the graphite should be used to effect the bonding. Thus, elemental titanium, zirconium, hafnium, vanadium, niobium, tantalum, chromium, molybdenum, tungsten, or some of the rare earths or indeed any elements which form carbides, may be used to accomplish the desired bond. The carbide-forming element must be one whose carbide may contain a variable amount of carbon. This carbon must be able to precipitate as graphite as the carbide is heated above the carbide-forming temperature and cooled, and to nucleate and grow into large graphite plates.

In accordance with my invention I provide a joint-forming or bonding material, such as elemental zirconium metal, either (1) in finely divided form, e.g. as a free flowing dry powder, or as a slurry or paste composition containing the bond-forming material as a powder, or (2) in the form of a thin layer or wafer-shaped to any desired configuration. The bond-forming material is applied to the surfaces to be joined and then heat, or a combination of heat and pressure are applied to raise the temperature of the joint region to an extent necessary to form a carbide zone.

The joining material may, as previously indicated, consist of any of the elements which form carbides, or of mixtures of two or more of such elements or their alloys. When used in finely divided form, the bonding material should be of a reasonably fine particle size. Dry powders of between 100 mesh (Tyler Standard) and 325 mesh (Tyler Standard) have been successfully used, and the particle size does not appear to be critical. Finer particle sizes permit the application of elevated temperatures for shorter intervals than coarser particles.

The temperature at the interface should be between 1750° C. and 2500° C., or even higher, depending on the specific joining material used. Such temperatures are conveniently obtained electrically, e.g. by resistance heating or induction heating or even by an arc. Whatever the means employed, it is necessary that the temperature developed at the interface be sufficient for a carbide to form at the interface, so that the bond ultimately comprises the carbide so formed, together with any carbon rejected by the carbide as graphite at temperatures exceeding about 2000° C. Thus the joint material may comprise either a carbide or a carbide-graphite combination produced by the rejection of some carbon from the carbide.

Many carbides have a tendency to fracture under tension. Hence, when a combination of heat and pressure is used to form the joint, it is preferable to use moderate pressures, for example pressures up to 1500 pounds per square inch, to avoid destruction of the joint or rupture of the graphite.

The following examples will serve to further illustrate the practice of my invention and are to be taken as illustrative and not limitative thereof.

Example I

Two graphite rods, one-half inch in diameter, were clamped in a resistance welder so that they were butted together with a layer of —200 mesh (Tyler Standard) zirconium metal powder between their ends. A pressure of 200 pounds was used to urge them together. The assembly was mounted in a furnace provided with means to maintain an argon atmosphere thereunder. The rods were heated by resistance heating by passing a direct current through the rods sufficient to produce a temperature of about 2150° C. at the joint. The pressure increased to 350 pounds as the temperature was raised. The interface region remained at about 2150° C. for 10 seconds, and then the heating was discontinued. When the rods had cooled, it was found that the two rods were firmly bonded together. Photomicrographs taken of the joint region showed that considerable graphitization had occurred. While I do not wish to be bound by any specific theory, I believe that at the elevated temperature to which the zirconium-graphite assembly was heated, some zirconium carbide formed and that as the carbide cooled, some carbon precipitated from the carbide and that this carbon, under the prevailing conditions, had become converted to graphite. The resultant joint, then, is characterized as a graphite to graphite joint bonded by graphite. Because of the appearance and strength of this joint, I believe that the decomposition of the bonding material produced graphite flakes which grew perpendicular to the joint with the result that a partially graphitized joint was produced, and at the same time at elevated temperatures some of the zirconium may have been volatilized. It will be seen, therefore, that by maintaining the materials at a sufficiently elevated temperature below the temperature at which the graphite volatilizes that most of the carbide-forming metal itself may be eliminated from the joint region and that ultimately an all graphite bond is formed in which the graphite flakes formed by the decomposition of the carbide have grown into each of the members being united.

Example II

The procedure employed in Example I was repeated at a temperature of about 2325° C. for 10 seconds and at at slightly higher initial pressure of 250 pounds. When tested in tensile the joined rods broke in the graphite and not in the joint, showing that the joint was at least as strong as the graphite.

One further matter should be noted in connection with my invention. Because of its properties, graphite is an excellent material for the construction of reactors and of other apparatus for processing fissionable materials. Because many of the carbide-forming elements have suitable neutron absorption coefficients, my invention may be peculiarly adapted to the fabrication of apparatus to be used in processing such material. By selecting the proper carbide-forming bonding materials, joints may be formed wherein the bond zone has substantially the same neutron capture as the graphite portions of the apparatus.

Having now described my invention in accordance with the patent statutes, I claim:

1. A method of forming a graphite bond between graphite members which comprises: assembling at least two graphite members having a common surface about a carbide-forming metal selected from the group consisting of titanium, zirconium, halfnium, vanadium, niobium, tantalum, chromium, molybdenum, and tungsten; subjecting the region adjacent said carbide-forming material to a temperature between 1750° C. and 2500° C. and sufficient to form a carbide of said metal; maintaining said region at said temperature for a time sufficient to permit the volatilization of a portion of said carbide-forming metal, and cooling said region, whereby graphite precipitates perpendicular to said common surface and forms a substantial portion of the resulting material joining said members.

2. The method of claim 1 in which said carbide-forming metal is in the form of a powder having a particle size between 100 mesh and 325 mesh.

3. The method of claim 1 in which moderate pressure is applied to the members of the assembly in order to maintain them in abutting relation during said heating step.

4. The process of claim 1 wherein said carbide-forming metal consists of finely divided zirconium particles.

5. The product of the process of claim 1.

References Cited in the file of this patent
UNITED STATES PATENTS

| | | |
|---|---|---|
| 227,370 | Man | May 11, 1880 |
| 968,949 | Jaburg | Aug. 30, 1910 |
| 2,093,390 | Wyckoff | Sept. 14, 1937 |
| 2,195,314 | Lincoln | Mar. 26, 1940 |
| 2,431,975 | Yockey et al. | Dec. 2, 1947 |
| 2,570,248 | Kelley | Oct. 9, 1951 |
| 2,650,943 | Leuchs et al. | Sept. 1, 1953 |
| 2,686,958 | Eber et al. | Aug. 24, 1954 |
| 2,739,375 | Coxe | Mar. 27, 1956 |
| 2,776,472 | Mesick | Jan. 8, 1957 |
| 2,813,921 | Vordahl et al. | Nov. 19, 1957 |